US009542408B2

(12) United States Patent
Moss et al.

(10) Patent No.: US 9,542,408 B2
(45) Date of Patent: Jan. 10, 2017

(54) METHOD AND PROCESS FOR ENABLING DISTRIBUTING CACHE DATA SOURCES FOR QUERY PROCESSING AND DISTRIBUTED DISK CACHING OF LARGE DATA AND ANALYSIS REQUESTS

(71) Applicant: PNEURON CORP., Nashua, NH (US)

(72) Inventors: Simon Byford Moss, Cos Cob, CT (US); Elizabeth Winters Elkins, Pompano Beach, FL (US); Douglas Wiley Bachelor, Groton, MA (US); Raul Hugo Curbelo, Sturbridge, MA (US); Thomas C. Fountain, Madison, NJ (US)

(73) Assignee: Pneuron Corp., Nashua, NH (US)

(*) Notice: Subject to any disclaimer, the term of this patent is extended or adjusted under 35 U.S.C. 154(b) by 0 days.

(21) Appl. No.: 13/943,187

(22) Filed: Jul. 16, 2013

(65) Prior Publication Data

US 2014/0012867 A1    Jan. 9, 2014
US 2014/0258315 A9    Sep. 11, 2014

Related U.S. Application Data

(63) Continuation-in-part of application No. 12/870,348, filed on Aug. 27, 2010, and a continuation-in-part of application No. 13/442,353, filed on Apr. 9, 2012.

(Continued)

(51) Int. Cl.
*G06F 17/30* (2006.01)
*G06N 3/02* (2006.01)
*G06Q 10/06* (2012.01)

(52) U.S. Cl.
CPC ........... *G06F 17/30132* (2013.01); *G06N 3/02* (2013.01); *G06Q 10/06* (2013.01); *G06Q 10/067* (2013.01)

(58) Field of Classification Search
None
See application file for complete search history.

(56) References Cited

U.S. PATENT DOCUMENTS 6,442,549 B1 * 8/2002 Schneider
7,685,083 B2   3/2010 Fairweather
(Continued)

FOREIGN PATENT DOCUMENTS

| JP | 2004-538542 | 12/2004 |
| JP | 2005-520224 | 7/2005 |
| JP | 2006-73007 | 3/2006 |

OTHER PUBLICATIONS

Japanese Notice of Reason(s) for Rejection, Translation, JP2012-527026, mailed Feb. 4, 2014, 3 pages.

(Continued)

*Primary Examiner* — Umut Onat
(74) *Attorney, Agent, or Firm* — Thompson Hine LLP

(57) ABSTRACT

A method and system for large data and distributed disk cache processing in a Pneuron platform 100. The system and method include three specific interoperable but distributed functions: the adapter/cache Pneuron 14 and distributed disk files 34, a dynamic memory mapping tree 50, and distributed disk file cleanup 28. The system allows for large data processing considerations and the ability to access and acquire information from large data sets 102a, 102b and rapidly distribute and provide the information to subsequent Pneurons 104 for processing. The system also provides the ability to store large result sets, the ability to deal with sequential as well as asynchronous parallel processing, the ability to address large unstructured data; web logs, email, web pages, etc., as well as the ability to handle failures to large block processing.

8 Claims, 5 Drawing Sheets

Related U.S. Application Data

(60) Provisional application No. 61/672,028, filed on Jul. 16, 2012.

(56) References Cited

U.S. PATENT DOCUMENTS

| | | | |
|---|---|---|---|
| 7,689,599 B1 * | 3/2010 | Shah et al. ..................... 714/19 |
| 7,831,643 B1 * | 11/2010 | Beloussov ........ G06F 17/30067 |
| | | | 707/823 |
| 8,069,242 B2 | 11/2011 | Hadar et al. |
| 2002/0029340 A1 | 3/2002 | Pensak et al. |
| 2002/0161624 A1 | 10/2002 | Bradlee |
| 2003/0033265 A1 | 2/2003 | Cabana et al. |
| 2003/0058277 A1 | 3/2003 | Bowman-Amuah |
| 2004/0122937 A1 | 6/2004 | Huang et al. |
| 2005/0090908 A1 | 4/2005 | Tamura |
| 2005/0149459 A1 | 7/2005 | Kofman et al. |
| 2005/0234799 A1 | 10/2005 | Hansen et al. |
| 2006/0184410 A1 | 8/2006 | Ramamurthy et al. |
| 2006/0242155 A1 | 10/2006 | Moore et al. |
| 2007/0078692 A1 | 4/2007 | Vyas |
| 2008/0133287 A1 | 6/2008 | Slattery |
| 2009/0113049 A1 | 4/2009 | Nasle et al. |
| 2009/0182778 A1 * | 7/2009 | Tormasov ......... G06F 17/30165 |
| 2009/0254572 A1 | 10/2009 | Redlich et al. |
| 2010/0064033 A1 | 3/2010 | Travostino et al. |
| 2010/0070448 A1 | 3/2010 | Omoigui |
| 2010/0070600 A1 | 3/2010 | Schulzrinne et al. |
| 2010/0077205 A1 | 3/2010 | Ekstrom et al. |
| 2010/0189099 A1 | 7/2010 | Bae et al. |
| 2010/0250497 A1 | 9/2010 | Redlich et al. |
| 2010/0293123 A1 | 11/2010 | Barrett et al. |
| 2011/0131589 A1 | 6/2011 | Beaty et al. |
| 2011/0145363 A1 * | 6/2011 | Ananthanarayanan et al. ............................ 709/218 |
| 2011/0227754 A1 | 9/2011 | Hill |
| 2012/0102103 A1 | 4/2012 | Jacobson et al. |
| 2013/0086039 A1 | 4/2013 | Salch et al. |
| 2013/0086064 A1 | 4/2013 | Salch et al. |
| 2013/0091122 A1 | 4/2013 | Salch et al. |
| 2014/0317031 A1 * | 10/2014 | Babenko ........... G06F 17/30017 |
| | | | 706/12 |

OTHER PUBLICATIONS

International Search Report and Written Opinion, PCT/US10/46971, mailed Nov. 23, 2010, 8 pages.

International Preliminary Report on Patentability, PCT/US10/46971, issued Feb. 28, 2012, 4 pages.

International Search Report and Written Opinion, PCT/US12/32726 mailed Aug. 17, 2012, 6 pages.

International Preliminary Report on Patentability, PCT/US12/32726 issued Oct. 8, 2013, 5 pages.

International Search Report and Written Opinion, PCT/US2012/069483, mailed Mar. 22, 2013, 7 pages.

Singapore Search Report, SG201201374-4 mailed Oct. 4, 2013, 6 pages.

Singapore Written Opinion, SG201201374-4 mailed Oct. 4, 2013, 10 pages.

Zhang et al., Migrating Legacy Applications to the Service Cloud, Object Oriented Programming, Systems, Languages and Applications (OOPSLA), 2009: Towards best practice in Cloud Computing. (2009) 59-68.

Sneed, Encapsulation of legacy software: A technique for reusing legacy software components, Annals of Software Engineering 9 (2000) 293-313.

International Search Report and Written Opinion, PCT/US2013/050673, mailed Mar. 4, 2014, 7 pages.

XMLNews.org, XML Basics, 1999, available at http://web.archive.org/web/20120627074440/http://xmlnews.org/docs/xml-basics.html, 6 pages.

* cited by examiner

METHOD AND PROCESS FOR ENABLING DISTRIBUTING CACHE DATA SOURCES FOR QUERY PROCESSING AND DISTRIBUTED DISK CACHING OF LARGE DATA AND ANALYSIS REQUESTS

This application is a continuation-in-part of U.S. patent application Ser. No. 12/870,348 filed on Aug. 27, 2010 and entitled "System and Method For Employing The Use Of Neural Networks For The Purpose Of Real-Time Business Intelligence And Automation Control"; and a continuation-in-part of U.S. patent application Ser. No. 13/442,353 filed on Apr. 9, 2012 and entitled "Legacy Application Migration To Real Time, Parallel Performance Cloud"; and claims the benefit of U.S. Provisional Patent Application No. 61/672,028 entitled "A Method And Process For Enabling Distributing Cache Data Sources For Query Processing And Distributed Disk Caching Of large Data And Analysis Requests", which was filed on Jul. 16, 2012, all of which are incorporated herein by reference

TECHNICAL FIELD

The present invention relates to enabling distributing cache data sources for processing large data and analysis requests and more particularly, relates to providing a distributed caching model to enable the management of distributed cache files on multiple servers or virtual machines and facilitating multiple distributed processing operations simultaneously.

BACKGROUND INFORMATION

Accessing geographically dispersed multiple systems and large datasets and being able to operate on this information to perform multiple simultaneous operations is very difficult. Combining and federating distributed operation results together compounds the problems. Most companies utilize an aggregated data warehouse with multiple feeder data sources and extraction, transformation, and loading (ETL) routines to organize distributed data together. The data preparation cost and time are signification.

Therefore, what is needed is a distributed cache evaluation and processing model that operates across multiple servers simultaneously. The system should function such that multiple analytic and business operations occur, while the system should also enable sampling and evaluation with collection and recording of results. Furthermore, the invention should provide for distributed cache creation and orchestration of coordinated distributed data access and generation of iteration results from other distributed applications. All distributed cache files operations should be coordinated together into unified processing models.

SUMMARY OF THE INVENTION

The system and method of the present invention implements an Adapter Pneuron that interacts within its distributed processing infrastructure for large data processing. The Adapter Pneuron enables the real-time acquisition of data from different types of application data sources, including service application programming interface (API), database, and files. Data is acquired and transformed into self-describing ASCII disk cache files with an associated definition of the structure. The disk cache files are distributed across one to many servers or virtual machines (VMs). The distributed disk cache files are accessed by participating Pneuron applications to perform operations selectively on the distributed disk data. Multiple operations are performed simultaneously by the different Pneurons with results evaluated and subsequent iteration operations applied. Evaluated results are concatenated and federated together across the different disk cache files simultaneously.

Disk cache files are removed automatically using a high-low disk evaluation model to remove disk cache files based on server disk utilization and automatic evaluation aging for disk cache files. The present invention enables the ability to quickly access target systems and data sources and generate distributed disk cache files, to simultaneously perform real-time operations by other Pneuron programs and to federate the results together. These activities occur without requiring preparation of the data.

BRIEF DESCRIPTION OF THE DRAWINGS

These and other features and advantages of the present invention will be better understood by reading the following detailed description, taken together with the drawings wherein.

Figure 1A:
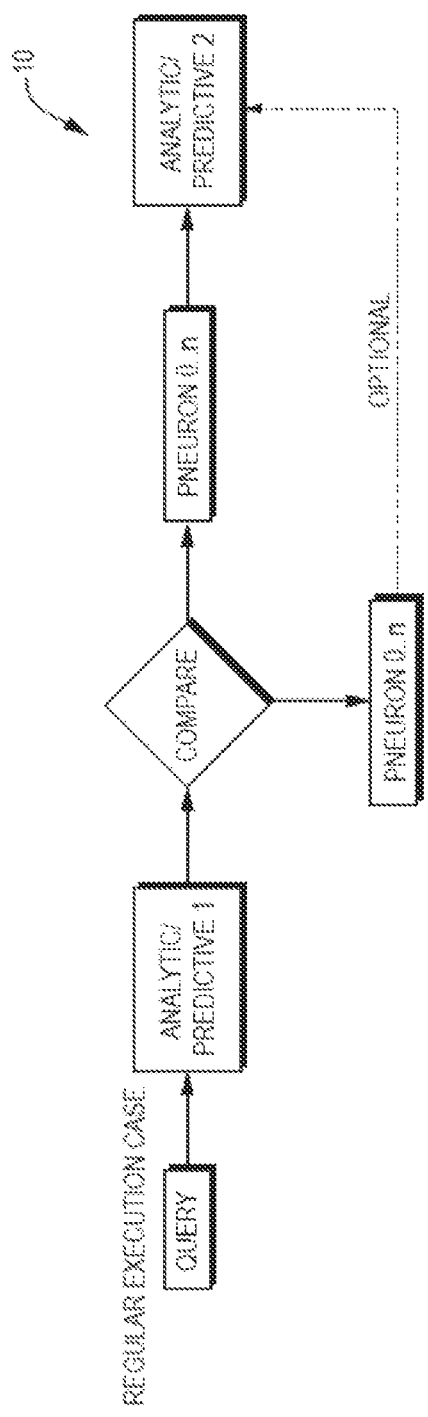
FIGS. 1A-1B are a comparison of the prior art process execution with the distributed cache model according to one embodiment of the present invention.

The neurons are all generally capable of subscribing to and receiving notification of system events, 501 and receiving messages 503; they are all capable of parsing XML messages and compiling them to the binary form recognizable by the SPU, 505; they are all based on a 'soft processing unit' or spu, 507 (this the neural network equivalent of a CPU in a computer, it can process a stream of binary codes and perform it's primary purpose once it receives the appropriate code stream); they are all capable of setting and preserving their state, 509 (the state is persistent, similar to SRAM); they are all capable of storing a metadata based rules matrix 511 that will determine whether or not the primary function is executed and in what way, (the primary function is expressed as some combination of state setting, message construction 513, message transmission 515, and event broadcast 517); and they are all capable of constructing outgoing messages and of transmitting outgoing messages to the enterprise message bus or to a list of neuron receptors 513, 515 and 517.

It is the nature of a neuron to be extremely small, simple, and provide very simple processing, but as part of a complex network of inter-reactive neurons, they can be assembled to serve a more complex purpose. The Neuron 500 receives the message at message receptor 503, updates its state 509 and evaluates the message based on its rules 511. If the execution rules are met, the neuron executes its primary function. The neurons can perform data retrieval and caching.

DETAILED DESCRIPTION OF THE PREFERRED EMBODIMENTS

Figure 4:
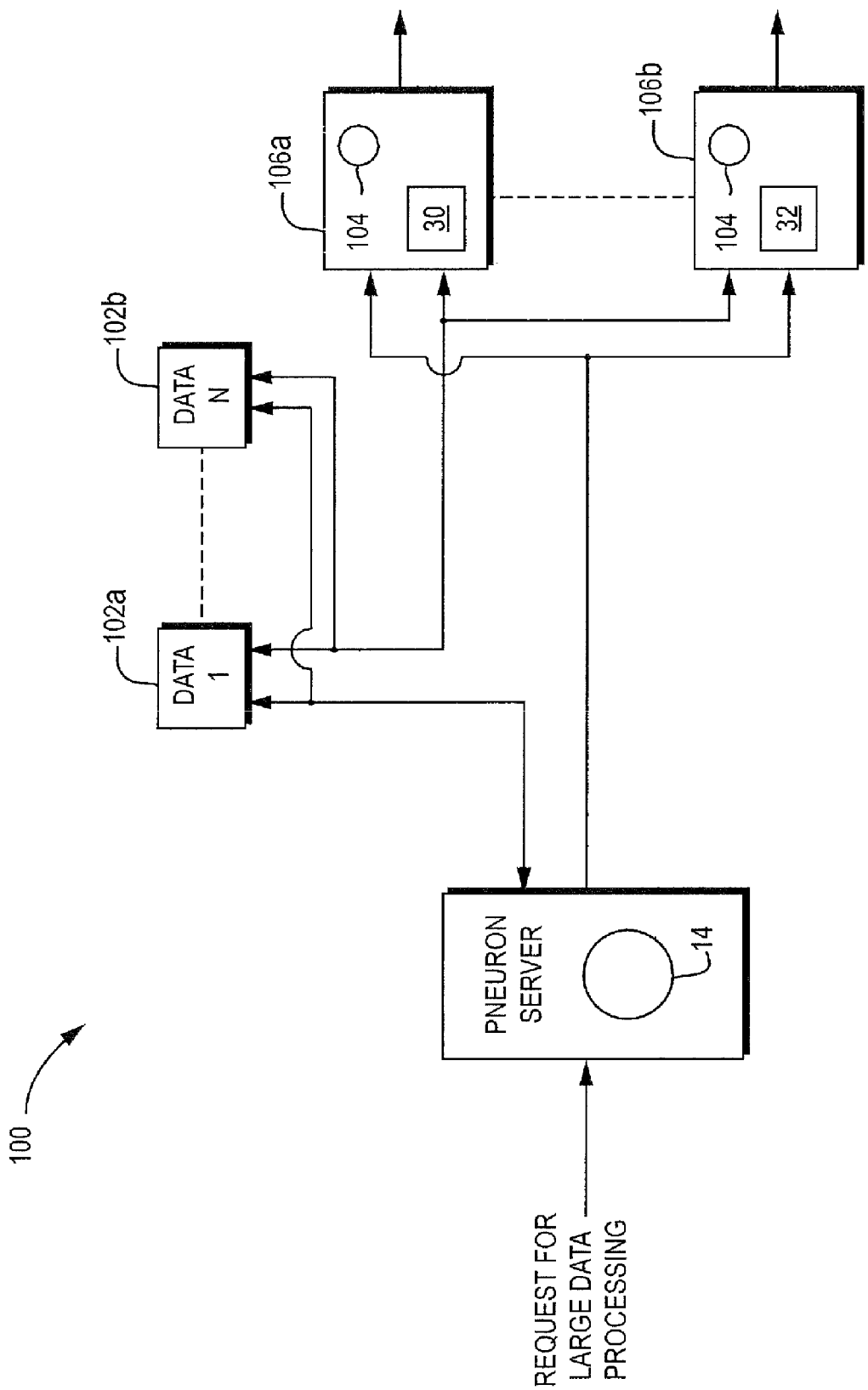
FIG. 4 is a block diagram of a system on which may be implemented the present invention.
Figure 5:
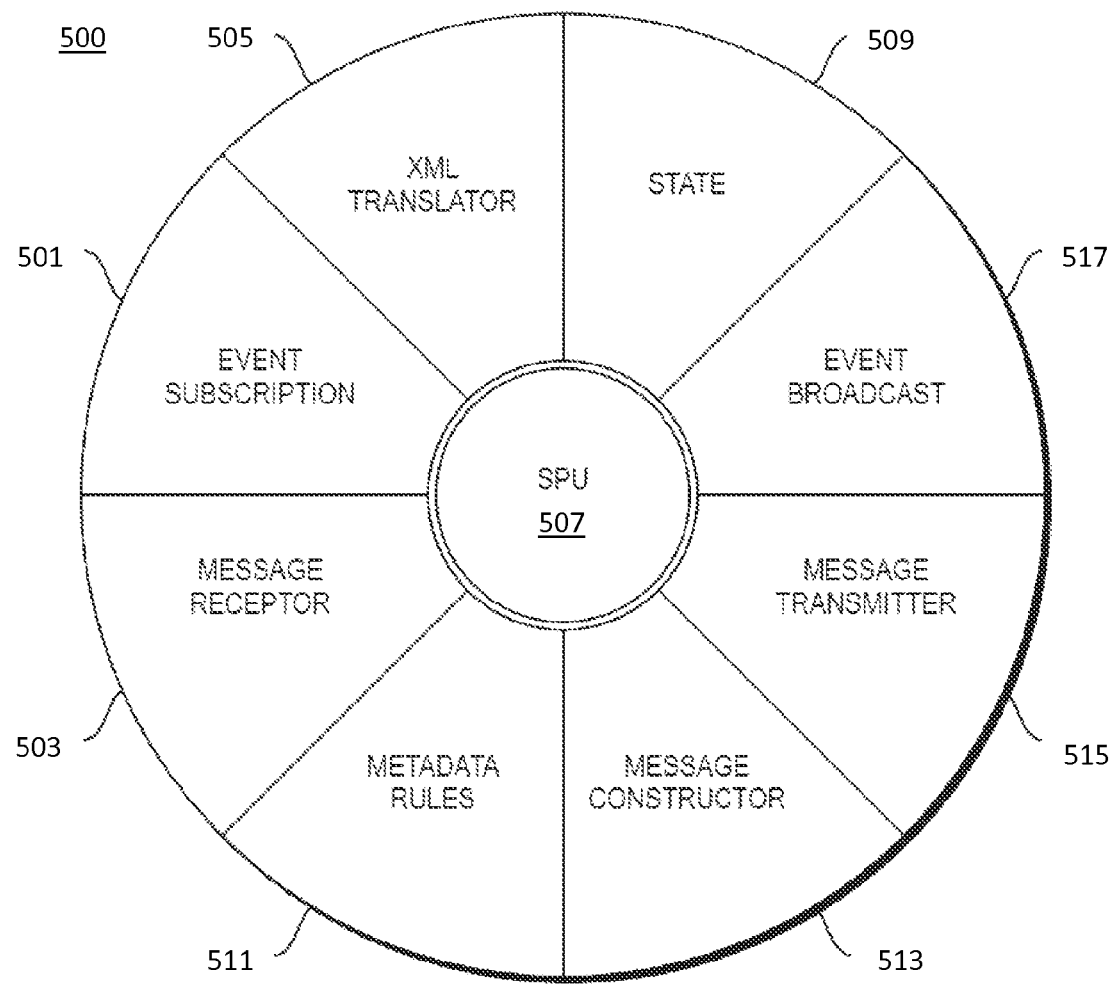
FIG. 5 is a diagram of a generic business intelligence neuron 500 explaining its components and how it fulfills its purpose. A neuron is a software object that contains seven (more or less) primary methods or tasks. It is capable of interacting within the neural network in a number of ways. There are many types of neurons, but they all share this common prototypical construction.

The present invention features a system and method for large data processing and requesting reconstruction. The system 100, FIG. 4 and method includes the capacity for large data processing considerations (targeting record, queries and responses of 1 million and higher results). The invention provides for the ability to access and acquire information from large data sets 102a, 102b (greater than 1 million records) and rapidly provide the information to subsequent Pneurons for processing combined with the ability to extract and render large data sets 102a, 102b from databases without impacting system of records processing and rapidly provide the information to subsequent Pneurons for processing. The system also has the ability for multi-threaded processing by multiple distributed adaptor/cache pneurons 14 of large data sets 102a, 102b, enabling storage and access to large historical results and the ability to handle large inputs. The invention provides the ability to store or persist large result sets. For example, a million plus raw data evaluation may generate a very large array of intelligence results that need to be persisted for future use, which might occur with time-series data with multiple month-years and multiple intelligence results for each intelligence record. Further, the invention is able to deal with sequential as well as asynchronous parallel processing, is able to address large unstructured data; web logs, email, web pages, etc. and is able to handle failures to large block processing.

The design considerations of the present invention are focused on maximizing distributed processing workload (volumes, results and requests) without running out of resources; e.g. hardware resources, including memory and CPU. The solution consists of essentially three specific interoperable but distributed functions. First, the Adaptor/Cache Pneuron 14 and distributed disk cache files 30, 32. Second, the dynamic mapping tree 200, FIG. 3. Third, the distributed disk cache file cleanup FIG. 4. Each function will be described in greater detail below.

The Adaptor/Cache Pneuron 14 (and/or distributed adaptor/cache pneurons) and distributed disk cache files 34a, 34b address the problem of extremely large record set processing which presents different technology challenges. Some of the current problems in the prior art include: loading all information into memory will exceed hardware server resources; and breaking up large requests presents complexities in consolidating and synchronizing the information results together and multiple operations may be required at different times by different programs across one or more large record sets.

Figure 1B:
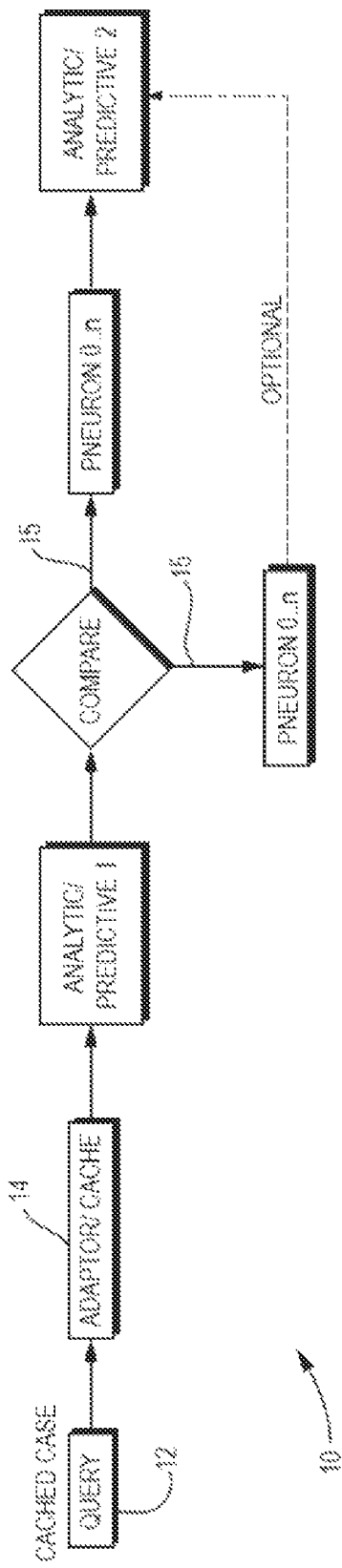

The present invention solves these problems by extracting large data sets 102a, 102b from target systems and data sources and converting them into distributed disk cache files 34. The disk-based intermediate cache files and processing is coordinated by and across multiple Pneurons 104 to perform multiple simultaneous operations on the information (distributed disk cache files 34). A comparison of the prior art system of process execution (FIG. 1A) and the distributed cache model of the present invention (FIG. 1B) is shown in FIG. 1.

The cache file based system 10 of the present invention will store the large requests within self-describing ASCII files and make these files (the data within them) available to any Pneuron that needs to access them. Large data requests 12, are received and processed by the Adapter Pneuron 14. The Adapter Pneuron 14 transforms the large data requests into ASCII file content (extended Comma Separated Values "CSV" format—including the attribute type definition), and saves the ASCII file content on the local host hard drive. Once a request is received, the Adapter Pneuron 14 will send to all its associated Pneuron 104 connections a special message that will announce that new work is available and the data can be accessed from the referred disk cache files 3032 from the target disk cache location 30, 32 on the file system. This process will perform in the same manner even if the request is composed from multiple batches, thereby allowing the request to be reconstructed. All of the Pneurons will interact with this model approach. The Adapter Pneuron 14 maintains context of each distributed cache file and provides system context to each participating Pneuron. Context includes the definition of the cached file format and information elements and location of the file. Participating Pneurons are able to parse the cached/adaptor Pneuron information and perform different operations.

Once the data has been cached, the Adapter Pneuron 14 will send to subsequently connected Pneurons 104 a special message 15 that will announce to all configured and associated Pneurons that new work is available and the Pneurons can execute their operations on the disk cache files. The system includes a utility that enables the calling Pneurons 104 to transform to and from XmlMessage to the target extended CSV extended file format.

As a result, the invention greatly simplifies the access and operations on the distributed disk cache data and provides a common abstraction layer and interface for the Pneurons to access and perform operations on the data. The Pneurons only need to read the referred file content and transform the information into usable XmlMessage Type data. In addition, the Pneurons can filter and extract only the necessary attributes as vectors or other objects and optimize the memory management resources.

This invention therefore provides many critical transformational benefits. The data is accessed and managed in disk cache files 30, 32 at targeted server 106a, 106b locations on the respective host cache system 31, 33 such that requests do not need to be reconstructed, which saves processing time and reduces complexity. The system ability to process very large amounts of data is significant and unconstrained. Within the actual memory processing, the information is streamlined. Only reference and common messages and pointers are included. The distributed cache file model enables a planning mechanism to be implemented to optimize the resources and synchronize distributed cache file access and processing. The messages do not require any complex logical operations that will require the file structure to change. The system will be fully capable of handling the CRUD operations (create-add new entry/record; read-record; update-record; and delete-record). This solution will work for all cases where the entity (large request—as a whole) will retain its integrity/structure.

Figure 2:
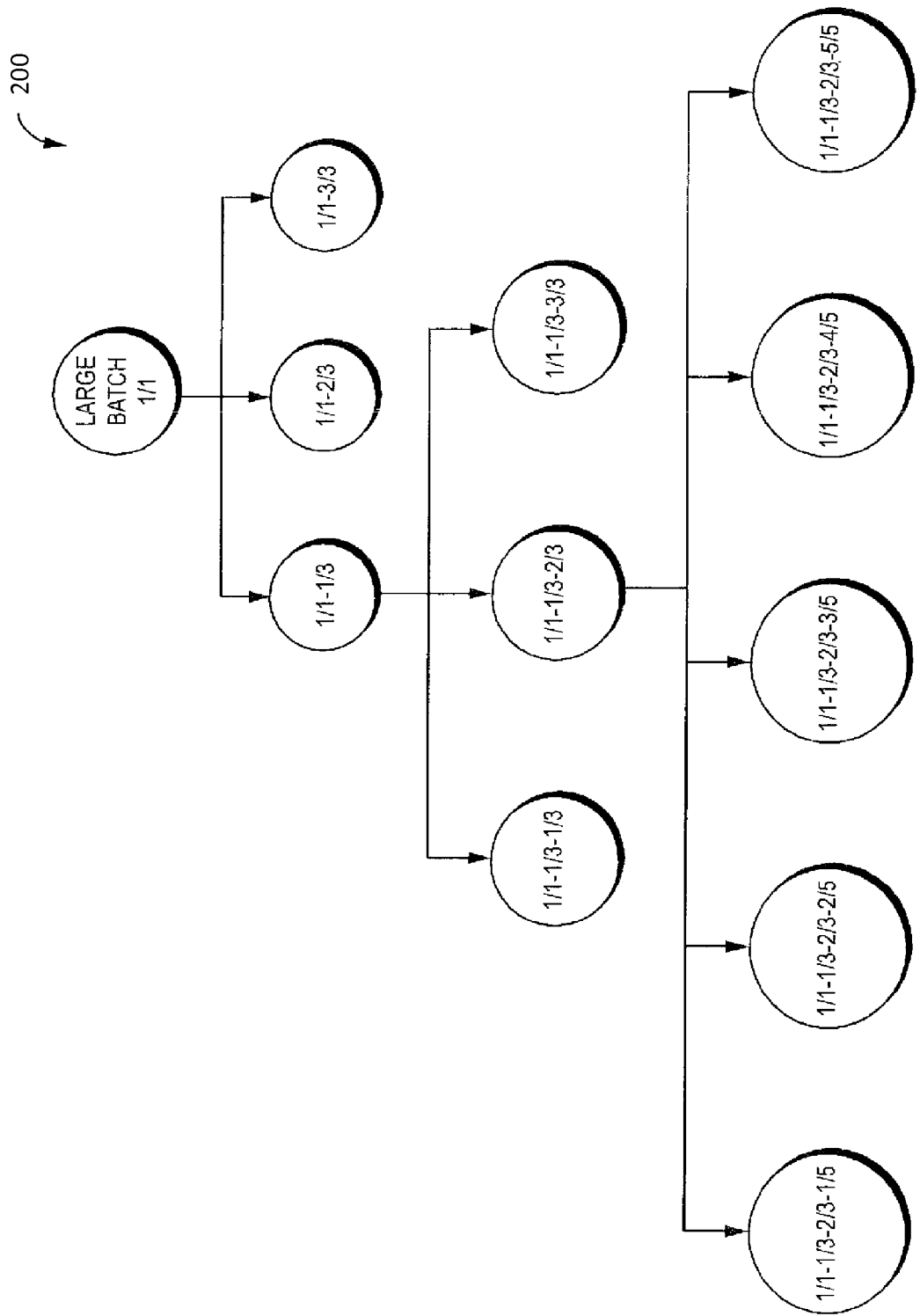
FIG. 2 is an overview of the dynamic memory mapping tree according to one embodiment of the present invention.

The dynamic mapping tree model shown for example in FIG. 2 is implemented to support the Adaptor Pneuron. The memory mapping enables a large data processing request transaction to retain its processing integrity from initiation through completion of an execution. By retaining processing integrity, the representation and all the data characteristics will be retained and accessible during the request life cycle. Data representation defines the meta-data characteristics of the information, including the way that the data is stored on the file system, the number of files, file types, data definition (attribute definition), request references etc.

In order to manage the distributed disk caching model, the invention enables the following operations to be performed on the disk cache files: Create—add new record within the large request; Read—access one or more records from the large request; Update—update/modify the data for one or more records; and Delete—delete one or more records. Given the synchronization and management complexities, the invention restricts the following functions: batching, duplicate batches and conditional batches.

To manage the distribution complexity of multiple disk cache files, the invention maintains and adjusts the system context dynamically. This model enables automatic changes to the data representation and structure. A programmatic change history tracking is maintained, which keeps track of changes applied to the disk cache file(s). This feature enables automatic reconstruction of the disk cache file at any given time to support a Pneuron initiated operation and request. The present invention has implemented a programmatic process to decompose large data sets into request into smaller batches. The batches are organized into parallel execution requests and configured as part of the Pneuron Networks definition.

A dynamic memory tree map, FIG. 2, is implemented to manage the distributed cache process across multiple Pneurons. The dynamic tree maintains and provides system context for the entire distributed processing model and plan. The entire processing life cycle is maintained. Each node/leaf within the dynamic tree will contain a file reference or a position/index reference and then point the Pneuron request message to the corresponding memory area. The dynamic memory tree map establishes a breadcrumb trail. Using this approach, the system is able to reconstruct the request with the new values by traversing the memory tree. The system merges and reconstructs the disk cache results based on the specific request. The same logic and approach is also applied for the Large Request Reconstruction, which enables a generic distributed disk cache operation model to be applied at the Pneuron Base Level.

The system will apply different solutions based on the context and type of operation. Dead (empty) messages are still sent out through the network. When a batch gets split in two or more sub-batches they are flagged. By doing this the system will be able to track the messages. The final Pneuron should have a max dead time interval, which will represent the time that it will wait for more batches. This time is checked/validated with the last batch arrival time. Each time a batch gets split the characteristic flag is appended with additional information meant to inform about the split. Example: 1/1-3/15-1/3-6/7-4/4. SPLIT is defined as [Position/Number Of Message/Batch]/[Total Number Of Messages]. Each time a batch gets split request, the split information will be appended to the current flag, which will be done for each split/sub batch. By the time the message reaches the Final Pneuron, the Pneuron will be able to establish the context based on the amount of information that it receives, and the Pneuron will be ready to create an execution tree, such as the one detailed in FIG. 2. This approach is based on the fact that when the Final Pneuron receives a batch request, it will be able to trace it and complete (or start if it is the first batch from a large request) based on the defined execution tree. Any sub-batch that is received is able to communicate with the Pneuron of all the tree node parents and also the number of "leafs" per split. With this approach the Final Pneuron will be able to map out what it should receive, also the information that it receives can be ordered.

There are scenarios where the requesting Pneuron is unable to interact with the distributed cache disk. Examples could include: (1) The target data source or system is not available for access by the Adapter Pneuron and the disk file cache cannot be created; and (2) The file system where the disk cache file is stored is not available. An Idle or Dead Time interval model can be implemented to manage this scenario, such that the Idle or Dead Time interval establishes a periodic mechanism to compose the message and send it further (or execute the request). The Idle or Dead Time interval evaluates each past request and the elapsed time when the last batch was received and the execution trigger.

Figure 3:
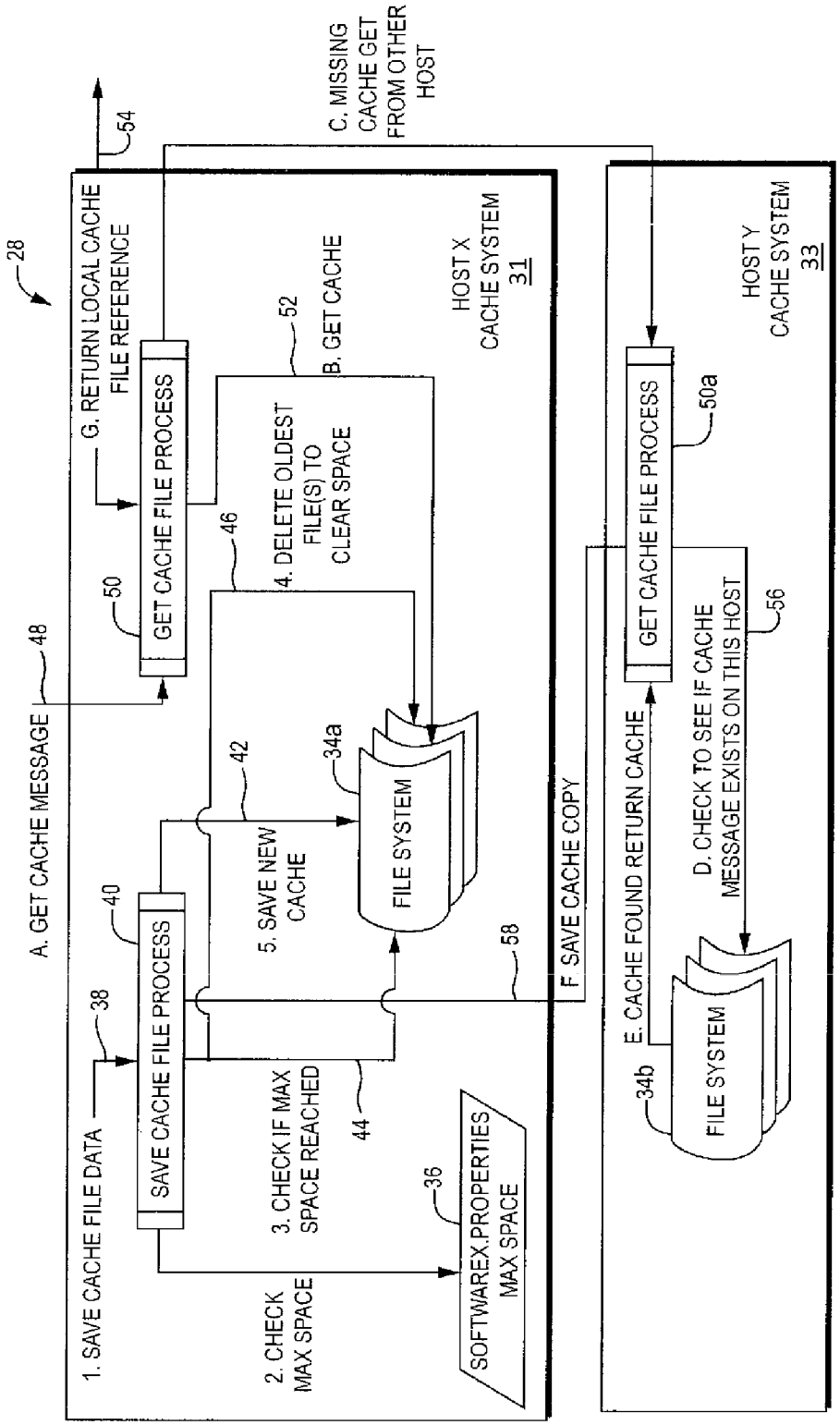
FIG. 3 is an overview of distributed disk cache removal model scenarios according to one embodiment of the present invention.

Finally, the distributed disk cache file clean up portion of the process 28, FIG. 3, provides users with the capability of caching data, within the entire system, on all the host cache systems 31, 33 that are running the platform (distributed pneurons 104). The cache is a file system 34 based mechanism that transforms and stores them indefinitely making them available to one or more worker process pneurons. Since the invention is dealing with a highly distributed system that provides value by providing the users with parallel computing capabilities, all the resources that are used within this computing process must be available at each host level (that takes part of the parallel execution). In doing so, each host will own a copy for each cache data that it will process. This creates a big problem because the hardware resources, hard drive space in this case is not unlimited, and since each host must have a local copy of the cached job the system does not deal with replication (duplicate resources—at different host levels).

Therefore, the present invention has implemented a High-Low distributed disk cache removal model. The invention configures properties for each host cache system 31, 33 (either a physical server or virtual server machine). The host Max Available Space property establishes the amount of bytes (megabytes or even gigabytes) that can be used by the caching system 34 on that specific server 106. Once this max threshold is reached, the system will delete existing cache files based on the size and age of the distributed cache file. This model will eliminate past files and enable new disk files to be established and used. The cache file system will be bounded with these rules; in this case the only rule/limitation that we need is to have a maximum level of space that it can be used in order to store the working cache files. This maximum level of space that can be used will be stored within the Softwarerx.Properties file 36 from CFG directory, because this is a centralized storage point for all the properties and attributes that must or can't be stored within the database.

The following examples are intended to provide details on how the distributed disk file clean up functions in the present system. In a first example, a save cache data request 38 is requested/received and max space has not been reached on the host server 30/32 cache system 31, 33. In this scenario, a Pneuron issues a request 38 to save data into the cache data file system 34. The request reaches the SAN (Storage Area Network or Cache System/process) 40. The system checks the Max Space configured value 36. The system 28 compares the Max Space with the actual available space on the local hard drive, which is the hard drive where the host system 106 is running, or more exactly where the "cache" directory file system 34 is found. In this first example there is sufficient space to save the information; therefore the system 28 will save the information 42 with the provided data (reference name/file name) in the file system 34.

In a second example, a save cache data request is requested and max space has been reached. In this scenario, a Pneuron issues a request to save data into the cache data system. The request reaches the SAN (Storage Area Network or Cache System). The system checks the Max Space configured value. The system compares the Max Space with the actual available space on the local hard drive, which is the hard drive where the system is running, or more exactly where the "cache" directory is found. The system determines 44 there is NO sufficient space to save the information. The system orders the existing cache data in descending order based upon the creation date. Then a loop occurs, which deletes the oldest file 46 and then re-checks to see if there is sufficient space. The loop ends once sufficient space is cleared or if there is nothing else to delete. If the system has sufficient space to save, then the information is saved 42 with the provided data (reference name/file name).

In a third example, a save cache data request is requested and max space has been reached, however the system is unable to make sufficient space. In this scenario, a Pneuron issues a request to save data into the cache data system. The request reaches the SAN (Storage Area Network or Cache System). The system checks the Max Space configured value. The system compares the Max Space with the actual available space on the local hard drive, which is the hard drive where the system is running, or more exactly where the "cache" directory is found. The system finds there is NO sufficient space to save the information. The system orders the existing cache data descending based upon the creation date. A loop is created, such that the oldest file is deleted and then the system re-checks to see if there is sufficient space. In this example, the system deletes all old files 46 and checks again for sufficient space and determines that there is not sufficient space and there is nothing else to delete, thereby ending the loop. In this example, the system does not have sufficient space to save and the system will register a failure.

In a fourth example, a system is able to get cache data when a local copy is available. In this scenario, the cache system receives a request 48 to get a specific data. This request can be issued by any Pneuron Instance that is supposed to use the cached data and needs to get a reference to the local file copy in order to read and parse/analyze or otherwise utilize the necessary information. The system receives a request to get cache data 48. The system process cache 50 checks to see if the cached data is found within the local file system 34. The cache data is found to exist 52 within the local file system. Return reference to cache data 54. The caller will then be able to use the data.

In a fifth example, a system is unable to get cache data because a local copy is not available. In this scenario, host cache system 31, 33 receives a request to get specific data 48. This request can be issued by any Pneuron Instance that is supposed to use the cached data and needs to get a reference to the local file copy in order to read and parse/analyze or otherwise utilize the necessary information. The system receives a request to get cache data 48. The system cache process 50 checks to see if the cached data is found within the local file system 34 a. The system determines that the cache data DOES NOT EXIST within the local file system. The Current Cache System asks the other registered host cache system 33 by calling their associated cache system process 50 a which check for existence of the data. A loop is created, such that the Foreign Cache file system 34 b of host cache system 33 is checked for data 56, then the data is found, and then the data is copied locally 58. The loop ends when there are no more hosts/cache systems to search or once the cache data is found. Return reference to cache data 58. The caller host cache system 31 will then be able to use the cached data.

In a sixth example, a system is unable to get cache data because a local copy is not available anywhere. The cache system receives a request to get a specific data. This request can be issued by any Pneuron Instance that is supposed to use the cached data and needs to get a reference to the local file copy in order to read and parse the necessary information. The system receives a get cache data request. The system checks to see if the cached data is found within the local file system. The system determines that cache data DOES NOT EXIST within the local file system. The Current Cache System asks the other registered host by calling their associated host cache systems 33 and checking for the data existence. A loop is created, wherein the system checks the Check Foreign Cache System for data and determines that the data is not found. The loop ends once there are no more hosts/cache systems to check and no cache data has been found. The system determines that the data was not found. A failure has occurred.

In summary, the present invention enables the real-time generation, management, and synchronization of distributed disk caches within a highly distributed processing environment. The process deconstructs and organizes large data sets acquired from disparate systems and data sources across an unlimited number of physical servers and virtual machines. An abstraction layer is applied across all distributed disk cache files. Multiple distributed Pneurons perform simultaneous operations across one or more disk cache files. Processing is synchronized automatically. The system maintains an in-memory mapping tree to maintain distributed interactions and provides the ability to dynamically construct and deconstruct the distributed cache files into any form. The distributed cache model enables synchronized federation of selected information from multiple distributed cache files automatically and as part of the Pneuron processing. The invention allows Pneuron to use existing client disk capacity and obtain and utilize targeted large data cache files on demand and without preparing aggregated data stores. As a result, businesses benefit by foregoing large data preparation activities.

Modifications and substitutions by one of ordinary skill in the art are considered to be within the scope of the present invention, which is not to be limited except by the allowed claims and their legal equivalents.

The invention claimed is:
1. A method for distributed processing of data, comprising the steps of:
   acquiring, by an adaptor neuron executing on a processor, data from a data source;
   creating, by the adaptor neuron on a first computer, a self-describing disk cache file based at least in part upon the data acquired from the data source;
   creating, by the adaptor neuron, a copy of the adaptor neuron and a copy of the self-describing disk cache file on a second computer;
   permitting access to the self-describing disk cache file through the adaptor neuron by a first participating application that is configured to perform a first data processing operation;
   permitting access to the copy of the self-describing disk cache file through the copy of the adaptor neuron by a second participating action that is configured to perform a second data processing operation;
   maintaining, by the adaptor neuron and the copy of the adaptor neuron, a memory tree map of change history to both the self-describing disk cache file and the copy of the self-describing disk cache file; and retrieving, by the copy of the adaptor neuron, in response to a request for information in the copy of the self-describing disk cache file at a point in the change history, the information from the copy of the self-describing disk cache file at memory location in the memory tree map corresponding to the point in the change history.

2. The method of claim 1, wherein at least one of the first computer and the second computer is a virtual machine.

3. The method of claim 1 wherein the access to the self-describing disk cache file and the copy of the self-describing disk cache file occurs simultaneously to allow multiple simultaneous operations on the information contained in the self-describing disk cache file and the copy of the self-describing disk cache file.

4. The method of claim 3, wherein at least one of the first computer and the second computer is a virtual machine.

5. The method of claim 1, further comprising the step of removing the self-describing disk cache file based at least in part on a high-low disk evaluation model.

6. The method of claim 5, wherein at least one of the first computer and the second computer is a virtual machine.

7. The method of claim 1, further comprising the step of removing the self-describing disk cache file based at least in part on an aging evaluation.

8. The method of claim 7, wherein at least one of the first computer and the second computer is a virtual machine.

\* \* \* \* \*